United States Patent
Husemann et al.

(10) Patent No.: US 6,824,728 B2
(45) Date of Patent: Nov. 30, 2004

(54) ELECTRON BEAM CROSSLINKING OF POLYACRYLATES

(75) Inventors: Marc Husemann, Hamburg (DE); Stephan Zöllner, Hamburg (DE)

(73) Assignee: tesa AG, Hamburg (DE)

( * ) Notice: Subject to any disclaimer, the term of this patent is extended or adjusted under 35 U.S.C. 154(b) by 0 days.

(21) Appl. No.: 09/789,376

(22) Filed: Feb. 20, 2001

(65) Prior Publication Data

US 2001/0026907 A1 Oct. 4, 2001

(30) Foreign Application Priority Data

Feb. 25, 2000 (DE) .......................................... 100 08 844

(51) Int. Cl.⁷ ............................................... C08F 2/42
(52) U.S. Cl. ...................... 264/446; 264/447; 264/448; 264/494; 264/495; 522/150; 522/153; 430/396; 430/270.1; 430/942; 427/496; 427/504; 427/505; 427/207.1; 427/208.4; 427/208.6
(58) Field of Search ............................... 522/150, 153; 430/396, 270.1, 942; 264/446, 447, 448, 494, 495; 427/496, 504, 505, 207.1, 208.4, 208.6

(56) References Cited

U.S. PATENT DOCUMENTS

| 4,100,311 | A | | 7/1978 | Nablo et al. .................. 427/44 |
|---|---|---|---|---|
| 4,287,255 | A | * | 9/1981 | Wong et al. ................. 428/343 |
| 4,438,177 | A | * | 3/1984 | Potter et al. .............. 427/208.4 |
| 4,677,014 | A | | 6/1987 | Bechen ........................ 428/195 |
| 4,714,655 | A | * | 12/1987 | Bordoloi et al. ............ 424/448 |
| 5,187,235 | A | * | 2/1993 | Bordoloi et al. ............ 522/121 |
| 5,266,400 | A | * | 11/1993 | Yarusso et al. ............. 428/345 |
| 5,416,127 | A | * | 5/1995 | Chandran et al. ........... 522/149 |
| 5,670,260 | A | | 9/1997 | Zajaczkowski et al. ..... 428/345 |
| 6,103,316 | A | * | 8/2000 | Tran et al. ................ 427/208.4 |
| 6,242,504 | B1 | | 6/2001 | Meyer-Roscher et al. ..... 522/2 |

FOREIGN PATENT DOCUMENTS

| DE | 25 20 847 | 11/1975 | |
|---|---|---|---|
| DE | 34 31 293 | 3/1986 | ............ H05B/3/36 |
| EP | 0 904 853 A2 | 3/1999 | ............ B05D/3/06 |

OTHER PUBLICATIONS

English Language Abstract DE 3431293 dated Mar. 6, 1986.
"Kleben", Gerd Habenicht, Auflage, Springer Verlag 1997, Seiten 31 bis 47.

* cited by examiner

Primary Examiner—James J. Seidleck
Assistant Examiner—Sanza L. McClendon
(74) Attorney, Agent, or Firm—Norris McLaughlin & Marcus

(57) ABSTRACT

A process for crosslinking polyacrylate compositions, wherein, by selective irradiation of the pressure-sensitive adhesive composition with electron beams, the polymer is cured only in certain structures and, as a result, structured pressure-sensitive adhesive compositions can be prepared.

25 Claims, 2 Drawing Sheets

ELECTRON BEAM CROSSLINKING OF POLYACRYLATES

The invention relates to a process for the crosslinking of polyacrylates by means of electron beams.

Adhesives are products which, in accordance with their respective chemical composition and prevailing physical state at the time of application, permit wetting of the surface on the adherends or in the course of heating thereof (e.g., adhesive films) and, in the joint, form the adhesive film necessary for the transfer of force between the adherends.

BACKGROUND OF THE INVENTION

An important criterion in producing an adhesive and for its properties is the degree of crosslinking, which affects both the viscosity and the adhesive properties. Crosslinking is the term used to denote the reaction in which a large number of linear or branched macromolecules, which initially are still soluble, become linked together to form three-dimensional polymeric networks (crosslinked polymers, network polymers) which are insoluble and now only swellable. Crosslinking is possible as a result of the formation of covalent and noncovalent (coordinative, ionic, physical, saltlike) bonds. Crosslinking can be carried out during the actual construction of the macromolecules and/or by reaction on preformed (pre)polymers which generally contain functional groups.

Within the industry, hotmelt processes with solventless coating technology are of increasing importance for the production of pressure-sensitive adhesive (PSA) compositions. Generally speaking, environmental regulations and increasing costs are pushing forward this development process. As well as SIS systems (styrene/isoprene/styrene copolymers), acrylic polymers are increasingly being applied from the melt as a polymer layer on backing materials.

As a result of the changeover to hotmelt processes, some of the crosslinking mechanisms employed to date are becoming superfluous. For example, thermal crosslinking techniques with metal chelates or polyfunctional isocyanates, which are very popular with the solvent systems, can no longer be used. At present, therefore, the crosslinking of polyacrylate PSA compositions by irradiation with ultraviolet light (UV) or with electron beams (EB)—the latter being known as electron beam curing (EBC)—is being implemented more intensively.

Generally speaking, UV crosslinking is a very simple process requiring only a simple coating used with a few low-pressure Hg lamps. UV crosslinking functions very well for polyacrylate compositions with low film thicknesses. The EBC technology is more expensive in terms of apparatus but tolerates the crosslinking of greater film thicknesses and faster web speeds.

For industrial applications, especially in automobile construction, there is a need for acrylic PSA tapes which possess thermal stability and shear strength. In addition to the high shear strength, however, the adhesive tapes ought also to possess high bond strength and a high contact adhesion (tack). In polyacrylate PSA compositions, high shear strength is achieved through a high average molecular weight and a high polarity. Furthermore, crosslinking must be carried out efficiently in order to produce an adhesive composition of very high shear strength.

The polar PSA compositions of very high shear strength possess the disadvantage, however, that they are unsuited to the hotmelt extrusion process, since high application temperatures are required and the molecular weight is reduced as a result of shearing in the extruder. Because of the high polarity and the high molecular weight, the bond strength of these adhesive compositions is not great and their tack is relatively low.

It is an object of the invention to provide a process with which it is possible to prepare a polyacrylate, especially an acrylic PSA composition, with good processing properties of the starting materials and intermediates for the hotmelt technology, for example, and combining ultimate shear strength with good bond strength and good tack.

The invention described presents a process for the selective preparation of structured polyacrylates and is outstandingly suitable for achieving the abovementioned object.

By selective irradiation of the polyacrylates with electron beams, segments of different hardness are produced; the resultant structuring of the crosslinked polyacrylates makes it possible to influence their properties in the desired manner.

SUMMARY OF THE INVENTION

The invention accordingly provides a process for the crosslinking of polyacrylate compositions, in which, by selective irradiation of the pressure-sensitive adhesive composition with electron beams, the curing of the polymer takes place only in certain structures and it is thereby possible to prepare structured pressure-sensitive adhesive compositions.

DETAILED DESCRIPTION

It has been found particularly advantageous to achieve the selective irradiation by covering the polyacrylate composition with a mask which permits the passage of electron beams only at selected points.

A further particularly appropriate variant of the invention is that wherein the selective radiation is achieved by covering the polyacrylate composition with a mask whose two-dimensional extent includes regions of different thickness, the permeability of the mask to electron beams being dependent on the thickness of the mask.

Also outstandingly suitable for the process is a procedure wherein the selective irradiation is achieved by irradiating different regions of the polyacrylate composition with electron beams of different intensity, the intensity of the electron beams being varied by modulating the acceleration voltage.

The process for crosslinking polyacrylates may be implemented in a particularly effective way if the polyacrylate composition used comprises polyacrylates or polyacrylate copolymers of the following monomers:

a) Acrylic monomers of the general formula

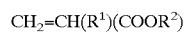

$$CH_2=CH(R^1)(COOR^2)$$

where $R^1$=H or $CH_3$ and $R^2$ is an alkyl chain with 2–20 carbon atoms, at 20–100 percent by weight, b) acrylic monomers of the general formula

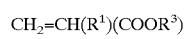

$$CH_2=CH(R^1)(COOR^3)$$

where $R^1$=H or $CH_3$ and $R^3$=H or $CH_3$, at 0–35 percent by weight, c) acrylic monomers of the general formula

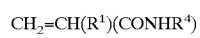

$$CH_2=CH(R^1)(CONHR^4)$$

where $R^1$=H or $CH_3$ and $R^4$=H or an alkyl chain with 1–6 carbon atoms, at 0–20 percent by weight, d) olefinically unsaturated monomers containing functional groups at 0–25 percent by weight.

One further development of the process is notable for the addition of crosslinkers, especially difunctional and/or polyfunctional acrylates and/or methacrylates, to the polyacrylate composition that is to be crosslinked.

The invention further provides for the use of the structured polyacrylates as a pressure-sensitive adhesive composition, especially for their use as a pressure-sensitive adhesive composition for an adhesive tape, the polyacrylate composition being present as a single-sided or double-sided film on a backing sheet.

Backing materials which may be used in this context, for adhesive tapes, for example, are the materials customary and familiar to the skilled worker, such as films (polyester, PET, PE, PP, BOPP, PVC), nonwovens, wovens and woven sheets, and also release paper if appropriate. This list is not intended to be conclusive.

For use, additional fillers, expansion agents, hollow beads, solid beads and/or compounding agents may be added to the acrylic composition.

Examples of suitable fillers here are carbon black, $TiO_2$, solid or hollow glass beads, or nucleating agents.

The principle of structured crosslinking and its effects on the properties of the PSA composition will be elucidated below.

The starting point is a low-viscosity polyacrylate composition whose processing properties are favorable for the hotmelt process. To produce adhesive tapes, the acrylic composition is applied to a backing material and only after this application is crosslinked by irradiation with electron beams, so that curing does not take place until it is on the backing and so the increase in viscosity desired for the end product does not disrupt the processing operation.

Application to the backing material may be made to either one or both sides, so that it is also possible to produce double-sided adhesive tapes. Advantageously, application and curing of the second PSA film takes place only after the first PSA film is already present in fully cured form (on the opposite side) on the backing.

The physical properties of the end product, especially its viscosity, bond strength and tack, may be influenced by the degree of crosslinking, so that the end product can be optimized by an appropriate choice of reaction conditions. By selective irradiation of the acrylic PSA composition, i.e., irradiation only in selected regions, and/or by local variation in the irradiation intensity, it is possible to produce highly crosslinked segments alongside segments with little or no crosslinking. The selection of regions exposed to high radiative intensity alongside those where irradiation is absent or of low intensity can be made by means of irradiation through a mask. Particularly suitable for this purpose are a grid or a perforated mask, which allows only local passage of the radiation, or alternatively an embossed film, whose varying thickness and/or density means that it has zones of different electron beam permeability. Also conceivable is the generation of regions of different hardness by means of location-dependent modulation of the energy dose; this can be achieved by varying the acceleration voltage.

BRIEF DESCRIPTION OF THE DRAWINGS

The principle described is elucidated further by means of two figures:

FIG. 1 depicts the irradiation of the acrylic composition (2) through a perforated mask (1), the acrylic composition (2) being located on the backing (3). The electron beams (4) are able to penetrate the mask (1) only in the region of the perforations (11), so that following irradiation the situation which results is that depicted in the bottom part of the figure: the PSA composition (2) has hard segments of high crosslinking (21) alongside uncrosslinked segments (22).

At the margins of the hard regions, the polymer chains extend into the soft regions, as a result of which the hard regions, of inherently high viscosity, are linked with the soft regions and so hinder their mobility, thereby increasing the structural strength of the adhesive composition. Moreover, these hard segments increase the cohesion of the PSA composition. On the other hand, the soft segments increase the ease of flow of the adhesive composition on the substrate and thus increase the bond strength and the tack. Great influence over the adhesive properties is possessed by the percentage fraction of the irradiated area and by the size of the segments produced.

Figure 1:
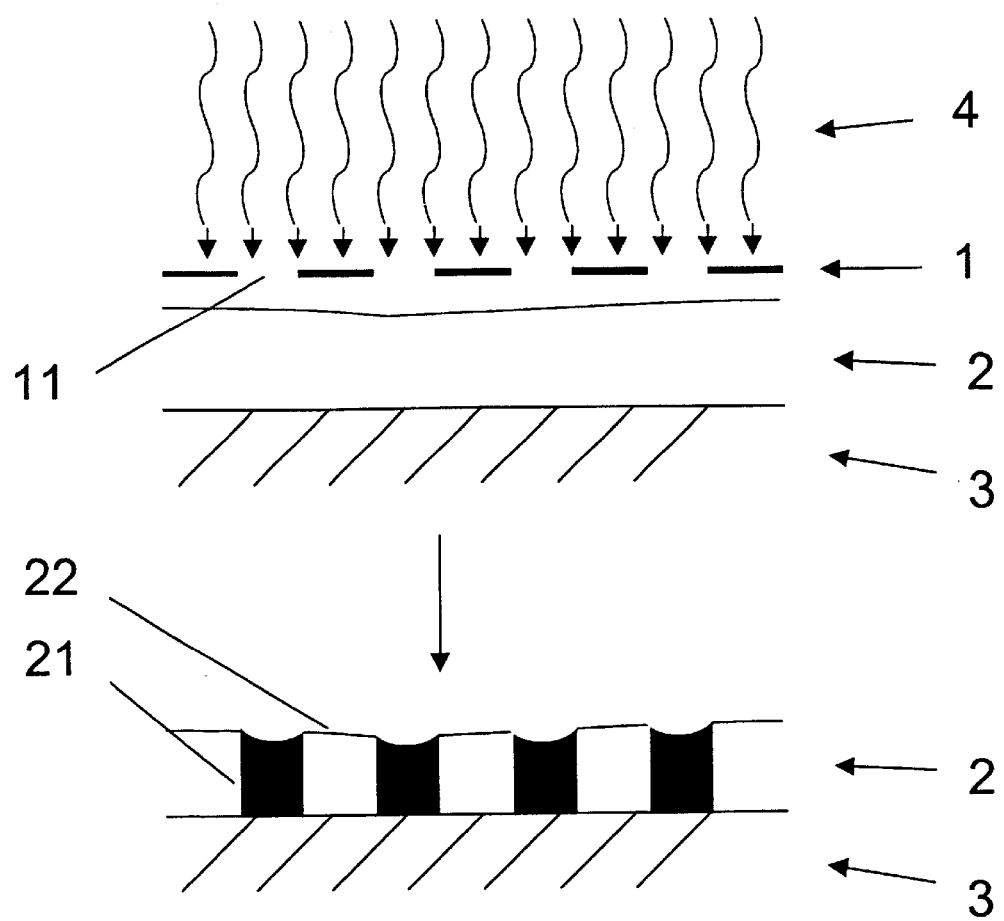
FIG. 1   Structuring of a polyacrylate composition by irradiation with electron beams, using a mask
FIG. 2   Structuring of a polyacrylate composition by irradiation with electron beams, using a film having zones of different radiation permeability
Figure 2:
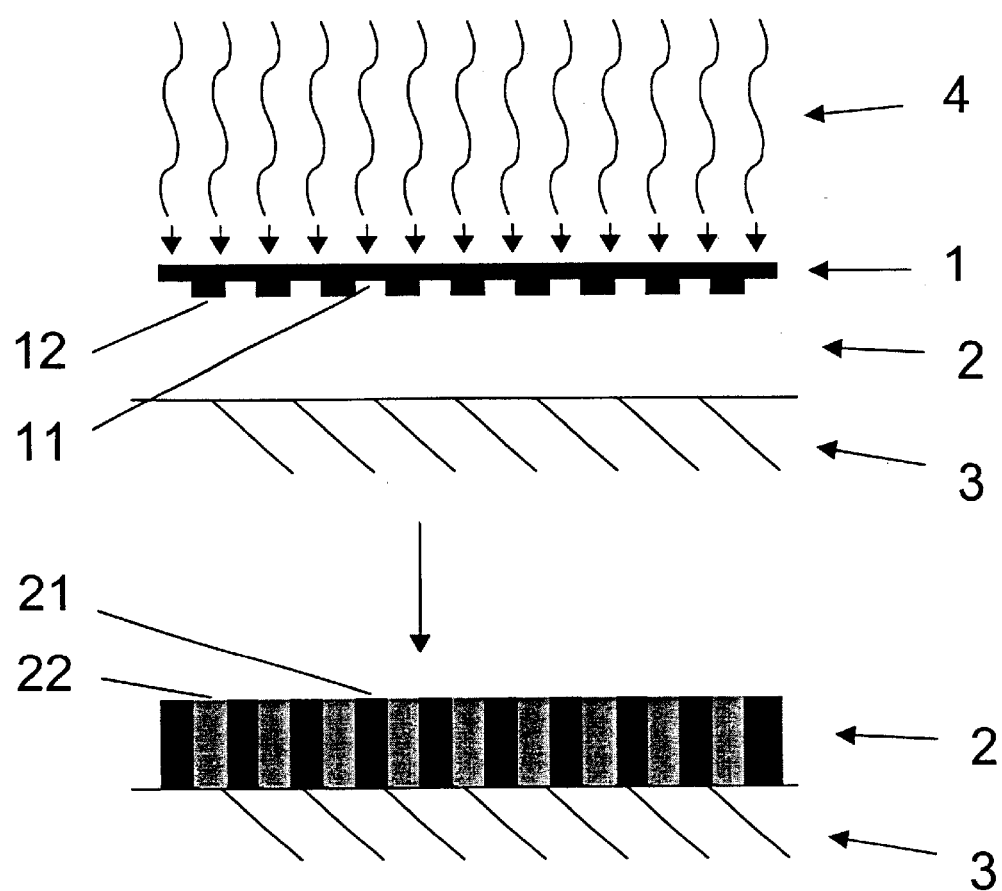

A similar picture results in FIG. 2 if irradiation takes place with electron beams (4) through a mask (1) having locally different, high radiation permeability (corresponding regions 11, 12). As a result of the different thicknesses of the mask (1), the PSA composition (2), which is again located on the backing (3), is crosslinked right through. The electron beams (4) pass substantially unhindered through the thinner layers (11), and in the segments (21) thus irradiated the adhesive composition (2) is fully crosslinked. The segments (22) on the other hand, which owing to the greater mask thickness (12) are exposed to a lower level of radiation, are crosslinked only to an incomplete extent. The result is a profile of fully crosslinked (21) and partly crosslinked (22) segments.

The mask for covering may comprise all materials which have an absorbing effect for electron beams. The form of the mask determines the form of the fully cured regions and the form of the soft regions.

As structured masks it is possible to use masks of different form and structure, examples being grids, perforated masks, masks with jagged structuring or with circular or annular structuring. The critical factor for the crosslinking, rather, is the thickness of the individual regions of the mask.

In general, the required dose for the crosslinking of PSA compositions is determined in accordance with the following formula:

$$D = K \cdot i / v \quad (1)$$

D=absorbed dose in kGy
i=radiative ouput in mA
v=belt speed
K=process factor.

The loss of energy, on the other hand, is dependent on the material to be penetrated and is defined as follows:

$$X = x \cdot \rho \quad (2)$$

X=standardized depth in $g/m^2$
x=depth ($\mu$m)
$\rho$=density of the material in $g/cm^3$.

The process factor is influenced by further parameters, such as the width of the electron beam, the acceleration voltage and, for irradiation with structured films, likewise by the density and thickness of the film material [Hermann Neuhaus Steinmetz, Radtech 1993, Chicago, USA; paper on "Penetration Depth of the Radiation Dose and Dose Yield for Low Energy Electron Beam Accelerators"].

The mask may therefore consist of any material suitable for absorbing high-energy radiation, especially electron beams, in accordance with equations (1) and (2), As examples, without wishing to impose any unnecessary restriction, mention may be made here of aluminum, titanium, iron and steel, zinc, and all other metals which are stable in air and are present in solid form; glass, electron beam stable plastics, ceramics, porcelains; and also all alloys, blends and multiphase systems of these materials.

Overall, the method of selective electron beam crosslinking through a mask or an embossed film is highly efficient for the structuring of polyacrylate compositions. The structuring produces hard and soft segments which in comparison to the homogeneously and fully irradiated regions have the same shear strength but are of much higher bond strength and tack.

A further positive effect of the structured crosslinking is the lower level of damage to the backing by the electron beams. The structuring of the PSA composition likewise reduces the number of electrons which penetrate the adhesive composition and the backing. Certain backing materials are severely damaged by electrons and electronic breakdowns.

The unwind forces for the adhesive tape may rise; white PVC backings, for example, undergo dark discoloration. The same phenomena are also observed in the case of release papers. As a result of the electron beam irradiation with a perforated mask, the backing material is not damaged at the unirradiated points. With this method, accordingly, the unwind forces for the acrylic PSA tape increase only to a relatively small extent. A similar effect is also observed when irradiation takes place with a structured mask with different electron beam permeability. In this case, the interface dose of the backing falls below the partially crosslinked segments, and at these points the material is damaged to a greatly reduced extent.

EXAMPLES

The following experimental series are intended to illustrate the invention, without there being any intention unnecessarily to restrict the concept of the invention through the examples depicted. The test methods below were used for technical investigation of the exemplary specimens depicted subsequently below.

Test Methods
Shear Strength (Test A)

A 13 mm wide strip of the adhesive tape was applied to a smooth and cleaned steel surface. The specimens were conditioned at room temperature for 4 hours and at 80° C. for 10 minutes. The application area was 20 mm×13 mm (length×width). At 80° C., a weight of 1 kg was fastened to the adhesive tape and the time which elapsed until the weight fell down was measured. This measurement was repeated at room temperature. The measured shear stability times are reported in minutes and correspond to the average of three measurements.

180° Bond Strength Test (Test B)

A 20 mm wide strip of an acrylic PSA composition applied as a film to polyester was applied to steel plates cleaned twice with acetone and once with isopropanol. The PSA strips were pressed twice onto the substrate with a 2 kg weight. The adhesive tape was then immediately peeled from the substrate at 300 mm/min and an angle of 180°, and the force required to do this was measured. All measurements were conducted at room temperature.

The results are reported in N/cm and are averaged from three measurements.

Rolling Ball (Test C)

A 25 mm wide adhesive strip is placed on a measurement rail with the side bearing the adhesive composition under test in contact with the rail. By releasing a locking device, a V2A steel measuring ball with a diameter of 4 mm rolls down a ramp and along a horizontal area which is coated with the adhesive composition.

The distance run on the adhesive film, in mm, serves as a measure of the tack.

Preparation of the Specimens
Specimen 1

A 2 l glass reactor conventional for radical polymerizations was charged with 40 g of acrylic acid, 20 g of N-tert-butylacrylamide, 340 g of 2-ethylhexyl acrylate and 266 g of acetone/isopropanol (97:3). After the solution had been freed from dissolved gases (oxygen, for example) by flushing with nitrogen gas, the reactor was heated to 58° C. with stirring and 0.4 g of 2,2'-azobis(2-methylbutyronitrile) was added. The external heating bath was then heated to 75° C. and the reaction was carried out constantly at this external temperature. After 4 and 6 h, the reaction mixture was diluted each time with 150 g of acetone/isopropanol mixture. After a reaction time of 36 h, the polymerization was terminated and the reaction mixture cooled to room temperature. The polymer was subsequently analyzed and was applied from solution at 50 g/m$^2$ to a surface-treated PET film. Alternatively, the solvent was evaporated off and coating took place from the polyacrylate melt. The coated film was then radiated from above with electron beams, with a dose of 40 kGy, and the PSA tape was cut and then subjected to adhesive testing in accordance with tests A, B and C.

Specimen 1B

After coating onto release paper, the acrylic adhesive composition from specimen 1 was covered with a siliconized film and the screen mask B. It was subsequently irradiated with electron beams, with a dose of 40 kGy, and the PSA tape thus produced was subjected to adhesive testing in accordance with tests A, B and C.

Specimen 1'

After coating onto release paper, the acrylic adhesive composition from specimen 1 was covered with a siliconized film and a structured aluminum foil. It was subsequently irradiated with electron beams, with a dose of 40 kGy, and the PSA tape thus produced was subjected to adhesive testing in accordance with tests A, B and C.

Specimen 2

The procedure was as for specimen 1. Polymerization was carried out using 16 g of acrylic acid, 192 g of n-butyl acrylate and 192 g of 2-ethylhexyl acrylate. The solvent amounts were retained.

Specimen 2B

After coating onto release paper, the acrylic adhesive composition from specimen 2 was covered with a siliconized film and the screen mask B. It was subsequently irradiated with electron beams, with a dose of 40 kGy, and the PSA tape thus produced was subjected to adhesive testing in accordance with tests A, B and C.

Specimen 3

The procedure was as for specimen 1. Polymerization was carried out using 24 g of acrylic acid, 316 g of 2-ethylhexyl acrylate, 40 g of methyl acrylate and 29 g of N-tert-butylacrylamide.

Specimen 3A

After coating onto release paper, the acrylic adhesive composition from specimen 3 was covered with a siliconized film and the screen mask A. It was subsequently irradiated with electron beams, with a dose of 40 kGy, and the PSA tape thus produced was subjected to adhesive testing in accordance with tests A, B and C.

Specimen 3B

After coating onto release paper, the acrylic adhesive composition from specimen 3 was covered with a siliconized film and the screen mask B. It was subsequently irradiated with electron beams, with a dose of 40 kGy, and the PSA tape thus produced was subjected to adhesive testing in accordance with tests A, B and C.

Specimen 3C

After coating onto release paper, the acrylic adhesive composition from specimen 3 was covered with a siliconized film and the screen mask C. It was subsequently irradiated with electron beams, with a dose of 40 kGy, and the PSA tape thus produced was subjected to adhesive testing in accordance with tests A, B and C.

Specimen 3D

After coating onto release paper, the acrylic adhesive composition from specimen 3 was covered with a siliconized film and the screen mask D. It was subsequently irradiated with electron beams, with a dose of 40 kGy, and the PSA tape thus produced was subjected to adhesive testing in accordance with tests A, B and C.

Specimen 3'

After coating onto release paper, the acrylic adhesive composition from specimen 3 was covered with a siliconized film and an embossed aluminum foil. It was subsequently irradiated with electron beams, with a dose of 40 kGy, and the PSA tape thus produced was subjected to adhesive testing in accordance with tests A, B and C.

Specimen 4

The procedure was as for specimen 1. Polymerization was carried out using 8 g of acrylic acid, 72 g of n-butyl acrylate, 40 g of N-tert-butylacrylamide and 280 g of 2-ethylhexyl acrylate. The solvent amounts were retained.

Specimen 4B

After coating onto release paper, the acrylic adhesive composition from specimen 4 was covered with a siliconized film and the screen mask B. It was subsequently irradiated with electron beams, with a dose of 40 kGy, and the PSA tape thus produced was subjected to adhesive testing in accordance with tests A, B and C.

Specimen 4'

After coating onto release paper, the acrylic adhesive composition from specimen 4 was covered with a siliconized film and an embossed aluminum foil. It was subsequently irradiated with electron beams, with a dose of 40 kGy, and the PSA tape thus produced was subjected to adhesive testing in accordance with tests A, B and C.

Results

The production of hard segments by selective electron beam crosslinking of polyacrylate PSA compositions was monitored on the basis of the prepartion of diverse acrylic PSA compositions by radical polymerization. The composition of the specimens analyzed is given in Table 1. For specimens 1–4, the molecular weight achieved was approximately 800,000.

TABLE 1

| Specimen | AA [%] | 2-EHA [%] | MA [%] | n-BuA [%] | NTBAM [%] |
|---|---|---|---|---|---|
| 1 | 10 | 85 | 0 | 0 | 5 |
| 2 | 4 | 48 | 0 | 48 | 0 |
| 3 | 6 | 79 | 10 | 0 | 5 |
| 4 | 2 | 70 | 0 | 18 | 10 |

AA    acryl acid
2-EHA  2-ethylhexyl acrylate
MA    methyl acrylate
n-BuA  n-butyl acrylate
NTBAM  N-tert-butylacrylamide Specimens 1–4 were applied from solution or as a hotmelt at 50 g/m$^2$ to a PET backing. Following the production of the samples, they were subjected to conventional, whole-area irradiation with a single-stage electron beam accelerator. As a result of the EBC, the polymer chains were crosslinked and the cohesion of the PSA composition increased. The specimens thus obtained were used as a reference for the selectively irradiated samples. With a dose of 40 kGy, adhesive testing gave the following results (Tab. 2):

TABLE 2

| Specimen | SST 10N, RT [min] (Test A) | BS (steel) [N/cm] (Test B) | Rolling Ball [mm] (Test C) |
|---|---|---|---|
| 1 | >10000 | 4.2 | 125 |
| 2 | 2430 | 5.2 | 78 |
| 3 | >10000 | 3.9 | 147 |
| 4 | 1345 | 4.8 | 92 |

SST: Shear stability times
BS: bonds strength

Table 2 indicates that, with shear stability times>10,000 minutes, adhesive compositions 1 and 3 are of relatively high shear strength. In contrast, the tack and the bond strength on steel are low. In the case of compositions of very high shear strength, the bond strength achieved is only about 4 N/cm, owing to the high internal hardness. Specimens 2 and 4, on the other hand, show a better tack in the rolling ball measurement and a higher bond strength on steel. For these compositions, of only moderate shear strength, a bond strength of about 5 N/cm is measured.

In order, then, to investigate the effect of the selective crosslinking, the same adhesive compositions were covered with thin metal grids and were irradiated through these masks with electron beams. To assess the effect of the percentage fraction of the irradiated area and the size of the segments produced on the adhesive properties, the adhesive compositions were irradiated with different masks (Tab. 3):

TABLE 3

| Mask | Open area | Mesh size [μm] |
|---|---|---|
| A | 33% | 200 |
| B | 34% | 250 |
| C | 60% | 200 |
| D | 50% | 500 |

Irradiation took place with an acceleration voltage of 230 kV and a dose of 40 kGy, the side irradiated from above being subjected to adhesive testing. The results of this testing are set out in Table 4:

TABLE 4

| Sample | SST 10N, RT [min] (Test A) | BS-steel [N/cm] (Test B) | Rolling Ball [mm] (Test C) |
|---|---|---|---|
| 3A | 4830 | 6.2 | 60 |
| 3B | 3890 | 5.7 | 74 |
| 3C | >10000 | 5.0 | 102 |
| 3D | 7565 | 5.7 | 76 |
| 1C | >10000 | 4.9 | 95 |
| 2C | 2050 | 6.4 | 60 |
| 4C | 1085 | 5.9 | 55 |

SST: shear stability time
BS: bond strength

The comparison of specimens 3A–3D shows the influence of the mask and thus of the irradiated surface area on the adhesive properties. The more permeable the mask to electron beams, the greater the number of hard segments produced and the greater the increase in cohesion (shear strength) of the polyacrylates. A comparison with the whole-area-irradiated reference composition 3 shows that at 33% irradiation (3A) the shear strength is lower but the bond strength on steel and the tack increase markedly. Specimen 3C illustrates the fact that, at 60% open area, the shear strength of the original composition is achieved but the bond strength and the tack are situated at a much higher level. The bond strength rises from 3.9 N/cm to 5.0 N/cm. Accordingly, by virtue of the selective electron beam irradiation, it is possible to produce a structured composition which retains its shear strength by virtue of the hard segments but which by virtue of the soft, uncrosslinked segments possesses a high bond strength on steel and a higher tack.

In contrast, changing the size of the segments produced had little effect (Comparison 3B and 3D). The shear strength, the bond strength and the tack are at virtually the same level. Specimens 2C and 4C illustrate the limitations of electron beam irradiation through a mask. The shear strength of these two PSA compositions is at almost the same level as the reference composition, but the bond strength and the tack are increased considerably.

In the following section, the effects of electron beam irradiation with a structured film on the adhesive properties are investigated. For further characterization, the shear strength, the bond strength and the tack of the PSA compositions was measured. For the investigation, samples 1, 3 and 4, with acrylic composition applied in each case at 50 g/m², were irradiated through an embossed Al foil (50 μm diameter—circular structuring) at 40 kGy and 230 kV acceleration voltage. The fully crosslinked segments produced had a diameter of 50 μm. The results of the adhesive evaluation are set out in Table 5.

TABLE 5

| Sample | SST 10N, RT [min] (Test A) | BS-steel [N/cm] (Test B) | Rolling Ball [mm] (Test C) |
|---|---|---|---|
| 1' | >10000 | 5.4 | 85 |
| 3' | >10000 | 4.7 | 105 |
| 4' | 1250 | 5.9 | 65 |

SST: shear stability time
BS: bond strength

Again, with the structured crosslinking, the shear strength of the adhesive compositions is retained. This is demonstrated by specimens 1' and 3'. If both the bond strength on steel and the tack are then compared with the values for the unstructured specimens, it is found that they increase at constant shear strength. For specimen 1', the bond strength measured was 5.4 N/cm, while the bond strength measured for specimen 3' was 4.7 N/cm. Owing to the softer, partially crosslinked segments, there is also generally an increase in the tack in the rolling ball test. In comparison to the samples which underwent electron beam curing over their whole area, the distance run by the ball is reduced from 125 to 85 mm (specimen 1) or from 147 to 105 mm (specimen 3). With shear stability times>10,000 minutes, the shear strength remains unchanged for both specimens.

What is claimed is:

1. A process for crosslinking polyacrylate compositions comprising the steps of,
    preparing a polyacrylate-based pressure sensitive adhesive composition, and
    selectively irradiating said adhesive composition with electron beams so that only selected portions of the pressure-sensitive adhesive composition are exposed to the electron beams wherein the selective irradiation is achieved by covering the polyacrylate composition with a mask whose two-dimensional extent includes regions of different thickness, density or both; the permeability of the mask to electron beams being dependent on the thickness, density, or both, of the mask.

2. The process for crosslinking polyacrylate compositions as claimed in claim 1, wherein the selective irradiation is achieved by irradiating different regions of the polyacrylate composition with electron beams of different intensity, the intensity of the electron beams being varied by modulating the acceleration voltage.

3. The process for crosslinking polyacrylate compositions according to claim 1 wherein the polyacrylate composition comprises polyacrylates polyacrylate copolymers, or both, of the following monomers:
    a) Acrylic monomers of the general formula $CH=CH(R')(COOR^2)$ where R'=H or CH, and $R^2$ is an alkyl chain with 2–20 carbon atoms, at 20–100 percent by weight,
    b) acrylic monomers of the general formula $CH=CH(R')(COOR^3)$ where R'=H or CH, and $R^3$=H or $CH_3$, at 0–35 percent by weight,
    c) acrylic monomers of the general formula $CH=CH(R')(CONHR^4)$ where R'=H or $CH_3$ and $R^4$=H or an alkyl chain with 1–6 carbon atoms, at 0–20 percent by weight,
    d) olefinically unsaturated monomers containing functional groups at 0–25 percent by weight.

4. The process, according to claim 1, wherein crosslinkers are added to the polyacrylate composition to be crosslinked.

5. The process according to claim 1, wherein bifunctional acrylates polyfunctional acrylates, bifunctional methacrylates, polyfunctional acrylates or combinations thereof are added as crosslinkers.

6. A pressure-sensitive adhesive composition comprising a polyacrylate composition crosslinked by the process of claim 1.

7. An adhesive tape comprising a polyacrylate composition crosslinked by the process of claim 1 as a single-sided or double-sided film on a backing.

8. The pressure-sensitive adhesive composition of claim 6, further comprising fillers, expansion agents, hollow beads, solid beads, compounding agents or a combination thereof.

9. A process for crosslinking polyacrylate compositions, the process comprising the steps of,
    preparing a polyacrylate-based pressure sensitive adhesive composition, and
    selectively irradiating the adhesive composition with electron beams so that only selected portions of the pressure-sensitive adhesive composition are exposed to the electron beams and wherein,
    the selective irradiating is achieved by covering the adhesive composition with a mask that is characterized by having one or more areas of different electron beam transmissibility wherein the pressure sensitive adhesive is applied to a backing material prior to the selective irradiating, and,
    wherein the backing material comprises at least a portion of the mask.

10. The process of claim 9, wherein the backing material is a polymeric film.

11. The process of claim 9, wherein the backing material is a woven or nonwoven fabric.

12. The process of claim 9, wherein the backing material is paper.

13. The process of claim 9, wherein the different electron beam transmissibility of an area of the pressure-sensitive adhesive is correlated with the area's thickness or density, or both its thickness and density.

14. The process of claim 9, wherein the mask comprises one or more materials or compositions of differing electron transmissibility.

15. The process of claim 9, wherein the mask provides a uniform pattern of selective crosslinking over the two-dimensional extent of the selectively irradiated pressure-sensitive adhesive.

16. The process of claim 15, wherein the uniform pattern comprises selectively irradiated regions of the pressure-sensitive adhesive that are of substantially the same two-dimensional area.

17. The process of claim 16, wherein the selectively irradiated regions are equidistant from one another.

18. The process of claim 16, wherein the selectively irradiated regions are concentrated in groups and wherein the groups are equidistant from one another.

19. The process of claim 15, wherein the uniform pattern comprises selectively irradiated regions of the pressure-sensitive adhesive that are of substantially the same shape.

20. The process of claim 19, wherein the selectively irradiated regions of the pressure-sensitive adhesive are of substantially the same shape and two-dimensional area.

21. The process of claim 9, wherein after the selective irradiating, the previously masked pressure-sensitive adhesive, or a portion thereof, is removed from the backing material.

22. The process of claim 9, wherein the masked portion of the pressure-sensitive adhesive is not removed from the backing material.

23. The process of claim 15, wherein the irradiated portions are of similar size and shape and the irradiated portions are equally spaced apart.

24. The process of claim 9, wherein after selectively irradiating the pressure-sensitive adhesive the mask is removed, and the adhesive is further irradiated one or more times with electron beams.

25. A process for preparing a tape comprising a backing material to which is applied a pressure sensitive adhesive composition, the process comprising the steps of, preparing a polyacrylate-based pressure sensitive adhesive composition, and applying said pressure-sensitive adhesive, to a backing material, selectively irradiating said adhesive composition with electron beams so that only selected portions of the pressure-sensitive adhesive composition are exposed to the electron beams, wherein the selective irradiating is achieved by covering the polyacrylate composition with a mask whose two-dimensional extent includes regions of different thickness, density or both, the permeability of the mask to electron beams being dependent on the thickness, density, or both, of the mask, and wherein after the selective irradiating, the mask is removed and the previously masked portion of the selectively irradiated pressure sensitive adhesive remains in contact with the previously unmasked portion on the backing material.

\* \* \* \* \*

UNITED STATES PATENT AND TRADEMARK OFFICE
CERTIFICATE OF CORRECTION

PATENT NO. : 6,824,728 B2  
DATED : November 30, 2004  
INVENTOR(S) : Husemann et al.

It is certified that error appears in the above-identified patent and that said Letters Patent is hereby corrected as shown below:

Column 4,  
Line 65, "(2), As" should read -- (2). As --.

Column 9,  
Line 58, "both; the" should read -- both, the --.

Column 12,  
Line 10, "adhesive, to a" should read -- adhesive to a --.

Signed and Sealed this

Fourteenth Day of March, 2006

JON W. DUDAS  
*Director of the United States Patent and Trademark Office*